United States Patent Office 3,478,130
Patented Nov. 11, 1969

3,478,130
POLYPROPYLENE BLOCK COPOLYMER
AND PROCESS
Donald E. Hostetler, Monroeville, Pa., assignor to Dart Industries Inc., Los Angeles, Calif., a corporation of Delaware
No Drawing. Continuation-in-part of application Ser. No. 187,959, Apr. 16, 1962. This application May 4, 1967, Ser. No. 636,034
Int. Cl. C08f 15/04
U.S. Cl. 260—878                6 Claims

ABSTRACT OF THE DISCLOSURE

Profound changes in tensile impact strength for crystalline polypropylene compositions are obtained by a combination block copolymer composed of intermittent ethylene-propylene block copolymer segments along the length of a polyproplene chain followed by a linear polyethylene chain segment, the amount of ethylene in the intermittent block segments ranging from 1 to 2 percent by weight.

---

The present invention relates to a novel and useful composition and to a process for producing such a composition. More particularly, it relates to an improved low temperature impact resistant polypropylene composition and to a process for preparing the composition.

This application is a continuation-in-part of application Ser. No. 187,959, filed Apr. 16, 1962, now abandoned.

As heretofore known, propylene can be polymerized to a high molecular weight solid polymer by contacting propylene with a transition metal halide/organometallic catalyst such as titanium trichloride/triethyl aluminium. Typical methods of preparing polypropylene are disclosed in Belgian Patent 538,782 and U.S. Patents 2,949,447, 2,911,384 and 2,825,721. Generally, such processes produce propylene polymers having a molecular weight of from about 50,000 to about 5,000,000 with the proportion of the polymer which is insoluble in boiling heptane being crystalline in that it exhibits a crystalline structure by X-ray analysis. Crystalline polypropylene is well known in the art for its highly desirable properties such as high tensile strength, high modulus of elasticity and good resistance to elevated temperatures. However, in spite of these desirable physical properties, crystalline polypropylene is known to have undesirable properties in that it becomes quite brittle at low temperatures as described in U.S. Patent 3,018,263 and has low tensile impact values, thereby effectively precluding it from those end uses requiring these properties. Since many of the articles molded or formed from crystalline polypropylene are to be used outside in cold weather or in other ways subjected to low temperatures, it is highly desirable that the low temperature properties of crystalline polypropylene be modified so that it will not fail when subjected to stress at the lower temperatures.

SUMMARY OF THE INVENTION

It is an object of the present invention to provide a novel modified polypropylene composition which has improved low temperature impact resistance as compared to homopolymer crystalline polypropylene. A further object is to provide a novel polypropylene composition which improves the low temperature properties of homopolymer crystalline polypropylene while substantially maintaining the other desirable properties. Another object is to provide a process for producing a novel modified polypropylene composition having improved low temperature impact resistance. Another object is to provide a novel modified polypropylene composition which can be molded or processed in the same manner as conventional homopolymer crystalline polypropylene. A still further object is to provide a process for preparing a modified polypropylene composition in situ. Other objects will become apparent as the description of the invention proceeds.

These objects are accomplished by the present invention which provides an improved low temperature impact resistant modified crystalline polypropylene composition comprising a polypropylene block copolymer composed of polymer block chain segments AB and C, said AB block chain segment comprising crystalline polypropylene block chain segments A containing at intervals along the length thereof block chain segments of a random copolymer B of at least two alpha-olefin monomers having from 2 to 12 carbon atoms, the total amount of alpha-olefin monomer other than proplyene in said random copolymer block chain segments B ranging from about 0.5 to about 3.0 percent by weight of said AB block chain segments and, attached to at least one end of said block chain segments AB, a block chain segment C selected from the group consisting of a polyalpha-olefin of an alpha-olefin monomer having from 2 to 12 carbon atoms and copolymers of said alpha-olefins, said composition having an average molecular weight of from about 50,000 to about 1,000,000.

This invention is of general scope and includes novel combination block copolymers of alpha-olefins as well as a process for their preparation. For convenience in describing this invention, reference will be made mostly to polymers prepared from propylene and ethylene monomers. By "combination" block copolymers, it is meant that the polymers are prepared by combining a block copolymer such as a polypropylene containing along the chain length small segments or blocks of ethylene-propylene random copolymer with a crystalline polyethylene block. By small segments or blocks of a random ethylene-propylene copolymer is meant that a plurality of such blocks are placed along the chain length of a crystalline polypropylene chain so that the random copolymer blocks are surrounded by longer chain lengths of such crystalline polypropylene segment. Each individual ethylene-propylene random copolymer segment (this term is used interchangeably with the term "block") contains no more than one percent by weight of ethylene and at least two such random segments are required along the length of a polypropylene chain. It is preferred that from 1.2 to 1.6% ethylene be added intermittently in 0.25 to 0.4 percent by weight increments during a bulk propylene polymerization reaction per hour in conjunction with a 3 to 6% by weight polyethylene block. The resulting copolymers show from at least 2 to 10 fold increase in tensile impact strength over the propylene homopolymers in the very important commercially useful melt index range of 3 to 5. As will be set forth hereinafter, the intermittent addition of ethylene results in increased catalyst reactivity when a titanium trichloride is employed as a catalyst and data will be presented later showing generally the effect of such increased catalyst activities on the polymers prepared herein. In general, however, using a titanium trichloride and dry ball milled to increase its activity, the production rate of polymer in a bulk (monomer polymerized in the liquid state) polymerization reaction ranged from 300 grams of polymer per gram of catalyst (titanium trichloride) per hour to about 800. The higher reactivities occurred with temperatures of 150° F. with about 2% or more ethylene incorporated in the reaction. Reactivities of 300 to 500 grams of polymer per gram of titanium trichloride catalyst were obtained generally with less than 2 percent ethylene incorporation.

The present invention also provides an improved process of forming a modified crystalline polypropylene copolymer composition by the polymerization, in the presence of a reduced transition metal halide/organometallic catalyst, of a propylene monomer and a comonomer selected from the group consisting of ethylene, propylene and a $C_4$ to $C_{12}$ 1-olefin and mixtures thereof, to obtain a polymer composition having an average molecular weight of at least about 50,000 and up to about 1,000,000, the improvement comprising polymerizing the propylene monomer in the presence of hydrogen in a reaction zone to form a polypropylene chain and interrupting the growth of said chain by introducing said comonomer in small substantially equal increments into the zone simultaneously with said propylene monomer at given time intervals until the said comonomer is added in amounts of from about 0.5 to about 3% by weight based on the weight of the polymers in the composition and the composition therefore consists of random propylene-comonomer blocks surrounded by polypropylene chain segments. After the foregoing composition is formed the process in the preferred embodiment hereof includes the further step of adding a comonomer to the reaction zone in the substantial absence of propylene so as to form a polymeric chain of the comonomer on at least one end of the interrupted polypropylene chain; said comonomer being added to the ends of the chain in amounts of from about 3 to about 20% by weight, preferably 3 to 12 percent by weight, based on the weight of the polymers in the composition, and being selected from the group consisting of ethylene, a $C_3$ to $C_{12}$ 1-olefin and mixtures thereof.

In a preferred embodiment of the present invention the average molecular weight of the crystalline polymers in the composition is from about 50,000 to about 1,000,000, more preferably 100,000 to about 750,000, and the composition is formed solely from propylene and ethylene with the ethylene being employed intermittently in amounts of from about 0.5 to about 3%, and the polypropylene chains of the composition being terminated with from about 3 to about 20% by weight of ethylene.

The terminology "low temperature impact resistant polypropylene composition" is used in the same sense as "brittle point" which is referred to in numerous patents, such as U.S. Patent 3,018,263. It is measure of the temperature at which the polymer exhibits brittle failure under specific impact conditions as hereinafter more fully pointed out. Polypropylene polymers are well known in the art to have a quite high "brittle point" and thus are particularly well suited for the modification of the present invention.

The percentages by weight noted herein are based upon the propylene and comonomers used to form the modified crystalline polypopylene compositions. Should other polymers or materials be added to the compositions of the present invention, the weights of such added materials are excluded from weight percentage calculations.

The term "intermittently" signifies that there is a plurality of additions which both start and stop while polymerization proceeds. Thus, when intermittent addition takes place, a predetermined quantity of the comonomer is allowed to completely react with the propylene in the reaction zone, more polypropylene is allowed to form and the comonomer is again added to the polymerization zone. While the time interval may be varied considerably depending on the reaction conditions, the additions are generally spaced at intervals of at least 2 minutes to allow complete reaction of the comonomer and preferably from about 3 to about 20 additions can quite easily be made during polymerization. More preferably, from about 4 to about 12 additions are made at intervals of from about 5 to about 30 minutes.

The phrase "in the substantial absence of propylene" is employed to mean that the propylene is vented from the system so that any propagation of the polypropylene chain is substantially avoided. The expression "to form a polymeric chain of the comonomer on at least one end of the polypropylene chain" or "terminating block segment" merely signifies that the propylene polymerization reaction is terminated by the addition of the comonomer to the reaction zone. The olefinic "($C_4$ to $C_{12}$ 1-olefin)" is used to signify an unsaturated comonomer having from 4 to 12 carbon atoms. Such comonomers include, for example, butene-1, butene-2, 3-methyl butene-1, pentene-1, 4-methyl pentene-1, hexene-1, 1,3-butadiene, 1,8-nonadiene, 1-undecene, 1-nonene, 1,10-undecadiene, 1,11-dodecadiene, 1,3-cyclopentadiene, 1,4-cyclohexadiene, 1,5,9-cyclododecatriene and the like, as well as mixtures of such comonomers. Other equally suitable monomers are known in the art.

In carrying out the reaction, the propylene and/or the comonomer are contacted in the presence of hydrogen with the catalyst at any temperature within the range of about —50° F. to about 200° F. Preferably, the reaction is carried out somewhat above room temperature and a particularly preferred temperature range is from about 70° F. to about 150° F. The catalyst employed may be for example, $3TiCl_3 \cdot AlCl_3$ or $TiCl_3$ in conjunction with a hydrocarbon aluminum compound such as triethyl aluminum, triisobutyl aluminum, triisohexyl aluminum, trioctyl aluminum, dimethyl aluminum chloride, diethyl aluinum chloride, ethyl aluminum dichloride or methyl aluminum bromide.

The improvement provided by the preferred process of this invention, more specifically relates to a method for preparing a polymer of propylene of the type mentioned above wherein propylene is polymerized in the presence of hydrogen and at temperatures and pressures sufficient to maintain the monomer in liquid form that is at pressures of above about 150 p.s.i. during the polymerization and wherein the polymerization is carried out in the presence of a titanium trichloride catalyst which has been activated with an organometallic reducing agent.

As will be illustrated in the various examples herein, the use of small quantities of ethylene has also resulted in enhancement in catalyst activity as well as an improvement in the low temperature brittleness properties of polypropylene.

In the foregoing described polymerization of propylene in liquid form, the preferred catalyst is a violet titanium trichloride and even more preferred, a titanium trichloride having the formula $3TiCl_3 \cdot AlCl_3$ activated with diethylaluminum chloride. The amount of catalyst to be employed should be sufficient to cause the polymerization of propylene, and in general the amount can range from about 1/6000 to 1/500 by weight based on the polypropylene formed, the Ti/Al mole ratio being 1:1 to 4. Hydrogen, in accordance with this invention is used to control molecular weight of the polypropylene chain segments and the amount can vary from about 0.016 mole percent based on the liquid propylene to 0.42 mole percent.

The use of hydrogen in the amounts indicated above, or in p.s.i. that is from about 5 to about 25 p.s.i. for polymers having a melt index of from about 1 to about 25, results it is believed in the formation of crystalline homopolymer propylene in situ due to the chain terminating action of hydrogen. The effect of hydrogen is to terminate the preponderance of the active propagating propylene chains so that composition contains a major amount of crystalline polypropylene chains formed in situ, that is, in intimate admixture with the block copolymers of this invention. Thus, the composition of this invention, referring to polymers and copolymers of propylene and ethylene is believed to consist of polypropylene chains containing along the length thereof segments or blocks of an ethylene-propylene random copolymer (small amorphous blocks) followed by a polyethylene chain attached to at least one end of the interrupted polypropylene chain and homopolymer crystalline polypropylene chains in intimate admixture therewith.

In the intermittent addition of ethylene to a bulk propylene polymerization process followed by addition of a polyethylene block to the interrupted polypropylene chain, the resulting composition has improved low temperature behavior and high tensile impact properties and these improvements are obtained without noticeable sacrifice of the other desirable properties of polypropylene especially when from 0.5 to 2 percent, preferably 1 to 2 percent of ethylene based on the propylene feed is employed. With these amounts of ethylene a beneficial increase in catalyst activity of from 35 to 50% is obtained.

In the intermittent addition of ethylene to propylene in a bulk of diluent process it is believed as noted above that random copolymer block segments surrounded by crystalline polypropylene segments are formed. In a composition of this type the polypropylene segments preserve most of the desirable homopolymer characteristics (stiffness, tensile yield strength, etc.) and the random ethylene-propylene copolymer imparts a decrease in the brittleness temperature lower than the propylene homopolymer.

The optimum 35 to 40% increase in catalyst activity occurs with about 1 to 2% ethylene incorporation at 10 to 15 minute intervals as will be illustrated later herein, while at 30 minute intervals for the ethylene addition, the activity is somewhat lower but still higher than the case where no small amounts of ethylene are introduced to the propylene polymerization.

In the intermittent addition of ethylene to propylene in the preferred bulk polymerization process in addition to the above discussed results, a noticeable increase in molecular weight is observed with an increase in time between ethylene additions up to 15 minutes and an increase in hydrogen from 8 to 15 p.s.i. was necessary to give a decrease in polymer molecular weight as determined by reduced specific viscosity measurements.

The following examples are given to illustrate the invention and are not intended to limit it in any manner. In the examples all parts are expressed in parts by weight unless otherwise indicated.

The melt index of the examples is expressed in decigrams per minute as measured by ASTM–D–1238–57T employing a temperature of 230° C.

The molecular weight ranges of the polypropylene compositions of the examples are determined by the Chaing equation for the intrinsic viscosity (i.v.)—average molecular weight ($\overline{Mw}$) relationship for polypropylene and polyethylene: polypropylene i.v.$=1.04 \times 10^{-4}$ $\overline{Mw}^{0.30}$ and polyethylene i.v.$=6.77 \times 10^{-4}$ $\overline{Mw}^{0.67}$ (Chaing, "Journal of Polymer Science" vol. 31, p. 453, 1958). For determining the range of the average molecular weight it is first assumed that the composition is all polyethylene and the average molecular weight determined on this basis. It is next assumed that the composition is all polypropylene and the average molecular weight determined. Since the composition contained both components, it is obvious that the average molecular weight would fall within the range between the two values obtained.

The following test procedures were used in polymer characterizations in accordance with this invention: Crystalline Melting Point: Determined by measuring under a microscope with crossed nicols. The temperature at which birefringence disappears is taken as the melting point; Vicat Softening Point: Method of ASTM–D–1525–58T; Heptane Insolubles: This is the well known method involving extraction with boiling n-heptane; Gurley Stiffness: Gurley Stiffness Tester procedure. The samples for testing are 2 inch strips, .02 inch thick and 1 inch wide, cut from 6 inch x 6 inch sheet compression molded at 375° F. to 400° F. The sheet was cooled in the press at 25° F. per minute; Tensile Yield Strength: Method of ATSM D–882–56T; Sample Size: 1 inch jaw gage with 0.25 inch wide and 0.02 inch thick strips cut from a sheet compression molded at 375° F. to 400° F. The Instron crosshead speed was 12 inches per minute; Tensile Modulus of Elasticity: Method of ASTM D–1530–58T, 2 inch gage on strips 0.25 inches wide and 0.02 inch thick pulled at 0.2 inch per minute: F50 Notched Impact Brittleness Temperature: Method of ASTM D–746–57T (Scott Test). The samples for testing are bars 1.5 inches long x 0.25 inch wide and 0.075 inch thick, cut from a 6 inch x 6 inch sheet, compression molded 375 to 400° F. and cooled at 25° F. per minute; the bars are notched 0.02 inch deep perpendicular to the width ½ to ⅛ inch from either end with a razor edge. Tensile Impact: Method of ASTM 1822–61T; Rockwell "R" Hardness: Method of ASTM D–785–51T; Reduced Specific Viscosity: Reduced specific viscosity of polypropylene from flow measurements in decalin solutions; Melt Index: Determined in decigrams per minute as measured by ASTM D–1238–57T employing a temperature of 230° C.

Example 1

To a 700 ml. stirred stainless steel pressure reactor is charged, under an argon atmosphere, 0.37 g. of 3TiCl$_3$·AlCl$_3$ and 4.9 cc. of 1.0 molar diethyl aluminum chloride in cyclohexane. The Al/Ti mole ratio is 2/1. The reactor is closed and pressured to 13 p.s.i.g. with hydrogen. Then 400 ml. of liquid propylene (0.58 g./cc.) is introduced with stirring at 79° F. The polymerization temperature is increased within about 5–10 minutes to 150° F. with external heating. The reactor pressure is that of the propylene gas at equilibrium. Five minutes after the propylene charge, 0.5 g. of ethylene is added gradually over 30 seconds. The ethylene addition, which is used up in about 1–2 minutes, is repeated every 15 minutes until 4 g. of ethylene is added. At the end of the first hour, 200 ml. additional liquid propylene is added to maintain a slurry in the reactor. At the end of two hours the reactor is vented, cooled to 102° F. and closed again. Ethylene is added at 2 g./minute for 5 minutes. After 10 minutes the reactor is opened at which time the reactor pressure has dropped to 0 p.s.i.g.

The polymer is purified and recovered by the following procedure. 500 cc. of methanol is added to the reactor and the alcohol-polymer slurry stirred for ½ hour. The slurry is transferred to a two liter beaker and heated to boiling with stirring. The hot slurry is filtered and the filter cake reslurried for one hour with 1 liter of a 50–50 mixture of water and alcohol containing 0.5 g. of potassium carbonate. After filtering, the washing is repeated without the potassium carbonate. The washed polymer is then mixed with 50 ml. of acetone and filtered. The wet polymer is vacuum dried for 12 hours at 60° C.

A yield of 200 g. of dry powdered polymer having an average molecular weight of from about 260,000 to about 360,000 is obtained with an intrinsic viscosity of about 2.9 and a melt index at 230° C. of 3.16. The physical properties of the polymer are given in Table I.

Example 1A

*Control.*—To the reactor of Example 1 is charged, under an argon atmosphere, 0.3 g. of 3TiCl$_3$·AlCl$_3$ and 4.0 cc. of 1.0 molar diethyl aluminum chloride in cyclohexane. The reactor is closed and 5 p.s.i.g. of hydrogen introduced in the reactor followed by 400 ml. of liquid propylene. The reaction temperature is increased to 150° F. within 5–10 minutes. After one hour an additional 200 cc. of liquid propylene is added. One hour later the reactor is vented and cooled and polymer purified as in Example 1.

A yield of 150 g. of polymer having an average molecular weight of about 407,000 is obtained. The polymer has an M.I. of 1.7 and an intrinsic viscosity of about 3.2. The physical properties of the polymer are given in Table I.

Example 1B

*Control.*—For comparison purposes, a commercially obtained general purpose polypropylene resin having an intrinsic viscosity of about 3.2 and an average molecular weight of about 420,000 is tested in the same manner as the polymer of Example 1. The physical properties of the polymer are given in Table I.

Example 2

To a 700 ml. stirred stainless steel pressure reactor is charged, under an argon atmosphere, 0.26 g. of $$3TiCl_3 \cdot AlCl_3$$

and 3.5 cc. of 1.0 molar diethyl aluminum chloride in cyclohexane. The Al/Ti mole ratio is 2/1. The reactor is closed and pressured to 12 ps.i.g. with hydrogen. Then 400 ml. of liquid propylene (0.58 g./cc.) is introduced with stirring at 76° F. The polymerization temperature is increased within about 5–10 minutes to 150° F. with external heating. The reactor pressure is that of the propylene gas at equilibrium. Five minutes after the propylene charge, 0.25 g. of ethylene is added gradually over 15 seconds. The ethylene addition, which is used up in about 1–2 minutes, is repeated every 15 minutes until 2.0 g. of ethylene is added. At the end of the first hour, 200 ml. additional liquid propylene is added to maintain a slurry in the reactor. At the end of two hours the reactor is vented and cooled.

The polymer is purified and recovered according to the procedure of Example 1.

A yield of 121 g. of dry powdered polymer having an average molecular weight of from about 1,000,000 to about 1,100,000 is obtained with an intrinsic viscosity of about 7.1 and a melt index at 230° C. of 0.1. The physical properties of the polymer are given in Table I.

Example 3

To a 700 ml. stirred stainless steel pressure reactor is charged, under an argon atmosphere, 0.33 g. of $$3TiCl_3 \cdot AlCl_3$$

and 4.4 cc. of 1.0 molar diethyl aluminum chloride in cyclohexane. The Al/Ti mole ratio is 2/1. The reactor is closed and pressured to 10 p.s.i.g. with hydrogen. Then 400 ml. of liquid propylene (0.58 g./cc.) is introduced with stirring at 72° F. The polymerization temperature is increased within about 5–10 minutes to 150° F. with external heating. The reactor pressure is that of the propylene gas at equilibrium. Five minutes after the propylene charge, 0.1 g. of ethylene is added gradually over 15 seconds. The ethylene addition, which is used up in about 1–2 minutes, is repeated every 5 minutes until 2.2 g. of ethylene is added. At the end of the first hour, 200 ml. additional liquid propylene is added to maintain a slurry in the reactor. At the end of two hours, the reactor is vented and cooled.

The polymer is purified and recovered according to the procedure of Example 1.

A yield of 150 g. of dry powdered polymer having an average molecular weight of from about 670,000 to about 770,000 is obtained with an intrinsic viscosity of about 5.4 and a melt index at 230° C. of 0.2. The physical properties of the polymer are given in Table 1.

Example 4

To a 700 ml. stirred stainless steel pressure reactor is charged, under an argon atmosphere, 0.30 g. of $$3TiCl_3 \cdot AlCl_3$$

and 4.0 cc. of 1.0 molar diethyl aluminum chloride in cyclohexane. The Al/Ti mole ratio is 2/1. The reactor is closed and pressured to 13 p.s.i.g. with hydrogen. Then 400 ml. of liquid propylene (0.58 g./cc.) is introduced with stirring at 75° F. The polymerization temperature is increased within about 5–10 minutes to 150° F. with external heating. The reactor pressure is that of the propylene gas at equilibrium. Five minutes after the propylene charge, 0.5 g. of ethylene is added gradually over 30 seconds. The ethylene addition, which is used up in about 1–2 minutes, is repeated every 15 minutes until 4 g. of ethylene is added. At the end of the first hour, 200 ml. additional liquid propylene is added to maintain a slurry in the reactor. At the end of two hours the reactor is vented, cooled to 102° F. and closed again. Ethylene is added at 2 g./minute for 10 minutes. Ten minutes later the reactor is opened at which time the ethylene has been consumed.

The polymer is purified and recovered according to the procedure of Example 1.

A yield of 210 g. of dry powdered polymer having an average molecular weight of from about 350,000 to about 450,000 is obtained with an intrinsic viscosity of about 3.5 and a melt index at 230° C. of 2.8. The physical properties of the polymer are given in Table I.

TABLE I

| | Total Percent Incorporation [1] | Melt Index at 230° C. | Notched Impact Brittleness Temp.,° C.[2] | Percent Heptane Insolubles | Crystalline Melting Point | Gurley Stiffness, mg./20 mil | Tensile Strength at Yield, p.s.i. | Modulus at 1% Strain |
|---|---|---|---|---|---|---|---|---|
| Example No.: | | | | | | | | |
| 1 | Ethylene, 4.9 | 3.2 | 0 | 89 | 167 | 5,500 | 4,800 | 150 |
| 1A | Control, 0.0 | 1.7 | +50 | 96.3 | 171 | 6,000 | 5,100 | 176 |
| 1B | do | 3.4 | +55 | 96 | 171 | 7,000 | 4,600 | 170 |
| 2 | Ethylene, 1.6 | 0.1 | −10 | 89 | 158 | 4,900 | 4,400 | 151 |
| 3 | Ethylene, 1.5 | 0.2 | −10 | 92.5 | 168 | 6,000 | 5,000 | 165 |
| 4 | Ethylene, 11.0 | 2.8 | −30 | 88 | 156 | 5,200 | 4,700 | 150 |
| 5 | Ethylene, 9.0 | 5.0 | −25 | 86 | 162 | 5,800 | 4,900 | 165 |

[1] By Infrared Analysis.
[2] ASTM designation D746-57T except that different sample bars (.25″ wide x 1.5″ long x .75″ thick) are cut from sheets pressed at 400° F. The sheets are cooled in the press at 25° F. per minute. The samples are placed in the Scot Tester with the width parallel to the impact bar. A notch .015″ deep is cut across the thickness with a razor sharp edge.

Example 5

To a 700 ml. stirred stainless steel pressure reactor is charged, under an argon atmosphere, 0.35 g. of $$3TiCl_3 \cdot AlCl_3$$

and 4.6 cc. of 1.0 molar diethyl aluminum chloride in cyclohexane. The Al/Ti mole ratio is 2/1. Ethylene is gradually added at 0.5 g./minute for 8 minutes at 75° F. One minute later the reactor pressure is 0 p.s.i.g. The reactor is then pressured to 13 p.s.i.g. with hydrogen. Then 400 ml. of liquid propylene (0.58 g./cc.) is introduced with stirring at 75° F. The polymerization temperature is increased within about 5–10 minutes to 150° F. with external heating. The reactor pressure is that of the propylene gas at equilibrium. Five minutes after the propylene charge, 0.5 g. of ethylene is added gradually over 30 seconds. The ethylene addition, which is used up in about 1–2 minutes, is repeated every 15 minutes until 4.0 g. of ethylene is added. At the end of the first hour, 200 ml. additional liquid propylene is added to maintain a slurry in the reactor. At the end of 2½ hours the reactor is vented, cooled to 100° F. and closed again. Ethylene is added at 2 g./minute for 5 minutes. Then minutes later the reactor is opened at which time the pressure has dropped to 0 p.s.i.g.

The polymer is purified and recovered according to the procedure of Example 1.

A yeld of 200 g. of dry powdered polymer having an average molecular weight of from about 230,000 to about 330,000 is obtained with an intrinsic viscosity of about 2.7 and a melt index at 230° C. of 5.0. The physical properties of the polymer are given in Table I.

Example 6

To a 700 ml. stirred stainless steel pressure reactor is charged, under an argon atmosphere, 0.4 g. of 3TiCl₃·AlCl₃ and 5.3 cc. of 1.0 molar diethyl aluminum chloride in cyclohexane. The Al/Ti mole ratio is 2/1. The reactor is closed and pressured to 13 p.s.i.g. with hydrogen. Then 400 ml. of liquid propylene (0.58 g./cc.) is introduced with stirring at 75° F. The polymerization temperature is increased within about 5–10 minutes to 150° F. with external heating. The reactor pressure is that of the propylene gas at equilibrium. Five minutes after the propylene charge, 0.25 g. of 1,5,9-cyclododecatriene is added gradually over 15 seconds. The addition, which is used up in about 1–2 minutes, is repeated every 15 minutes until 2.0 g. of the cyclododecatriene is added. At the end of the first hour, 200 ml. additional liquid propylene is added to maintain a slurry in the reactor. At the end of two hours, the reactor is vented, cooled to about 100° F. and ethylene added at 2 g./minute for 10 minutes. After 5 minutes the reactor pressure is 0 p.s.i.g. and the reactor is opened.

The polymer is purified and recovered according to procedure of Example 1.

The resulting polymer has an average molecular weight above about 250,000 and a notched impact brittleness temperature below 0° C.

Example 7

To a 700 ml. stirred stainless steel pressure reactor is charged, under an argon atmosphere, 0.35 g. of 3TiCl₃·AlCl₃ and 4.6 cc. of 1.0 molar diethyl aluminum chloride in cyclohexane. The Al/Ti mole ratio is 2/1. Ethylene is gradually added at 0.5 g./minute for 8 minutes at 75° F. One minute later the reactor pressure is 0 p.s.i.g. The reactor is then pressured to 13 p.s.i.g. with hydrogen. Then 400 ml. of liquid propylene (0.58 g./cc.) is introduced with stirring at 75° F. The polymerization temperature is increased within about 5–10 minutes to 150° F. with external heating. The reactor pressure is that of the propylene gas at equilibrium. Five minutes after the propylene charge, 0.25 g. of ethylene is added gradually over 15 seconds. The ethylene addition, which is used up in about 1–2 minutes, is repeated every 15 minutes until 2.0 g. of ethylene is added. At the end of the first hour, 200 ml. additional liquid propylene is added to maintain a slurry in the reactor. At the end of two hours the reactor is vented, cooled to 100° F. and closed again. Ethylene is added at 3 g./minute for 5 minutes. Ten minutes later the reactor is opened at which time the pressure is dropped to 0 p.s.i.g.

The polymer is purified and recovered according to the procedure of Example 1.

A yield of about 216 g. of a dry powdered polymer is obtained having a molecular weight above about 300,000 and a notched impact brittleness temperature below −20° C.

While the above shows generally the procedure for preparing the polymer of this invention further experimental work with the polymer herein are set forth below. The procedure for this further work was as described below for a laboratory batch process and for a continuous reactor. It will be noted that in this further work propylene was polymerized with the addition of ethylene at stated intervals and that following the desired number of ethylene additions (the formation of the AB block segment) the reactor was vented to drive off any unreacted propylene preparatory to the addition of the ethylene homopolymer block (the C block segment).

A.—Reaction conditions of the copolymerization (1) Catalyst: 3TiCl₃·AlCl₃ (0.3±0.05 g.)+DEAC (1 molar in cyclohexane)
(2) Al/Ti mole ratio: 2/1
(3) Hydrogen pressure: 1.5 atmospheres (4) Liquid propylene: 400 cc.
(5) Temperature: 130° F. and 150° F.
(6) Time: One to two hours.

B.—Intermittent ethylene addition

Example: At a catalyst activity of 450 g. per g. of 3TiCl₃·AlCl₃/hour for polypropylene at 150° F., with a 2% ethylene incorporation, the catalyst activity will increase approximately 40% with 4 to 6 ethylene additions (thus 450 becomes 630). The amount of ethylene needed in one hour is 12.6 g. for 2% ethylene incorporation.

The amount of ethylene for 0.3 g. of TiCl₃·AlCl₃ or 189.0 g. of copolymer per hour containing 2.0% ethylene is therefore 3.78 g. Assuming a rate of no more than 0.5% per addition and four additions per hour, 0.92 g. of ethylene would be needed in each addition.

C.—Reaction conditions for ethylene block copolymer addition (1) Venting: The excess propylene is flashed in one to five minutes to 5 to 80 p.s.i.g. reactor pressure at 100° F. to 120° F.
(2) Ethylene addition rate: .01 g./min. to 1 g./min.
(3) Time: one-fourth to two hours.
(4) Temperature during addition: 100° F. to 160° F.
(5) Reactor pressure: 0 to 120 p.s.i.g.

D.—Procedure for intermittent ethylene addition in a continuous reactor

Catalyst: 3TiCl₃·AlCl₃—DEAC F. to 120° F.
Catalyst residence time: Three hours
Reactor contents: 40% polymer, 60% liquid propylene
Productivity/g. of TiCl₃·AlCl₃: 500–2000
Catalyst reactivity or productivity rate: 300 to 600 (g. of polymer/g. of TiCl₃·AlCl₃/hour)
Number of intermittent additions for per hour are calculated on the basis of 4 additions for a catalyst reactivity for 360 for copolymer.
Percent ethylene per addition at 130° F.: 0.5% based on polymer production.
Percent ethylene total intermittent addition: 2.0% based on polymer production.
Ethylene block copolymer: 7% (70 to 90% C₂)

Following the specific conditions noted above for a laboratory batch reaction a series of polymerizations were carried out as illustrated in the following tables. For comparison, commercial polymers of propylene and blends containing a polyisobutylene as well as block copolymers of other types are shown. Purification, that is deashing and upgrading of the polymers of this invention was performed by the use of an alcohol-hydrocarbon mixture such as methyl or isopropyl alcohol and heptane.

The combination copolymers in Tables II, III, IV and V below were prepared, for the most part, at 150° F. with a methyl alcohol extraction to remove catalyst. The polymers shown at 130° F., however, were extracted with a heptane-isoproponol mixture.

The physical testing data obtained on the intermittent ethylene plus ethylene block copolymers are given in Tables II, III and IV. The tables are presented according to the increase in total ethylene content (by infrared analysis) of the polymer. The copolymers in each table generally are listed according to the number of ethylene additions.

The percentage of ethylene per addition and the total intermittent ethylene is based on the weight of ethylene added experimentally. The ethylene block copolymer is calculated as the difference between the total ethylene by infrared analysis and the total intermittent ethylene.

In Tables II, III, IV and V below, the copolymers of this invention are shown in comparison to two commercial high impact commercial polypropylenes. These are noted as Commercial A and Commercial B. The Commercial A polymer is a blend of 80% polypropylene and 20% polyisobutylene by weight. The Commercial B polymer is prepared in accordance with French Patent No. 1,290,523 and is a block copolymer of ethylene and propylene. According to the patent, the ethylene block is added prior to the homopolymerization of propylene.

As strikingly shown, there are "combination" (intermittent plus ethylene block copolymers) copolymers in the 3 to 5 melt index range that have tensile impact strengths 2 to 5 times higher and lower notched brittle temperatures, than either the commercial A and B polymers with less sacrifice in polymer stiffness, tensile yield, or vicat softening temperature. In the tables, $C_2$ will be used as an abbreviation for ethylene.

TABLE II.—COMBINATION COPOLYMERS (3–6% ETHYLENE) PHYSICAL PROPERTIES

| Ex. No. | No. of $C_2$ Add. | Percent $C_2$ per Add. | Percent $C_2$ Interm. | Percent $C_2$ as a Block | Total $C_2$ by IR | Melt. Index at 230° C. | Notched Brittle Temp., °C. | Gurley Stiffness, mg./20 mil | Tensile at Yield, p.s.i.[2] | Percent Elong. at Break | Tensile Impact ft. lb./ in.[2] | Vicat Soft Temp., °C. | Percent Heptane Inso. | Decrease in Brittle Temp., °C.[3] |
|---|---|---|---|---|---|---|---|---|---|---|---|---|---|---|
| 1 | [4] | | | | | 3.2 | +15 | 5,500 | 3,400 | 160 | 40 | 149 | | 50 |
| 2 | [5] | | | | ≅5 | 3.0 | +12 | 4,500 | 3,600 | 600 | 40 | 133 | ≅95 | 50 |
| 3 | [6] | | | | | 2.6 | +61 | 5,800 | 4,600 | 20 | 20 | ≅155 | 90 | |
| 4 | 3 | 0.33 | 1.0 | 3.5 | 4.5 | 1.8 | +3 | 6,000 | 4,900 | 300 | 90 | 152 | 90 | 53 |
| 5 | 4 | 0.3 | 1.2 | 2.2 | 3.4 | 4.2 | 0 | 5,500 | 4,300 | 500 | 210 | 148 | | 67 |
| 6 | 5 | 0.25 | 1.25 | 4.2 | 5.5 | 4.2 | −3 | 4,700 | 4,500 | 600 | 150 | 145 | 87 | 70 |
| 7 | 9 | 0.2 | 2.0 | 3.5 | 5.5 | 2.8 | −13 | 4,700 | 4,000 | 265 | 150 | 141 | 85.1 | 74 |
| 8 [1] | 10 | 0.24 | 2.4 | 3.0 | 5.4 | 1.0 | −3 | 5,900 | 3,600 | 320 | >150 | | | 49 |

[1] Polymerization Temperature=130° F. (Polymers Extracted with Heptane, Isopropyl Alcohol).
[2] At 12"/min. (Instron Crosshead speed).
[3] Difference between brittle temperature of copolymer and brittle temperature of homopolymer with the same melt index.
[4] Commercial A.
[5] Commercial B.
[6] Homopolymer Control.

TABLE III.—COMBINATION COPOLYMERS (6–8% ETHYLENE) PHYSICAL PROPERTIES

| Ex. No. | No. of $C_2$ Add. | Percent $C_2$ per Add. | Total Percent $C_2$ Interm. | Percent $C_2$ as a Block | Total $C_2$ by IR | Melt. Index at 230° C. | Notched Brittle Temp., °C. | Gurley Stiffness, mg./20 mil | Tensile at Yield, p.s.i.[2] | Percent Elong. at Break | Tensile Impact ft. lb./ in.[2] | Vicat Soft Temp., °C. | Percent Heptane Inso. | Decrease in Brittle Temp., °C.[3] |
|---|---|---|---|---|---|---|---|---|---|---|---|---|---|---|
| 1 [1] | 6 | 0.7 | 4.2 | 4.1 | 8.3 | 1.09 | +1 | 4,600 | 3,700 | 1,250 | 70 | 139 | | 48 |
| 2 | 2 | 2.0 | 3.0 | 3.0 | 6.0 | 1.0 | −6 | 4,300 | 3,500 | 1,100 | 180 | 140 | | 54 |
| 3 | 8 | 0.25 | 2.0 | 4.7 | 6.7 | 0.6 | −15 | 4,900 | 3,700 | 1,100 | 190 | 138 | 87.3 | 58 |
| 4 | 2 | 0.25 | 0.5 | 5.5 | 6.0 | 6.5 | +12 | 4,500 | 4,000 | 400 | 65 | | | 62 |
| 5 | 4 | 0.5 | 2.0 | 6.0 | 8.0 | 3.0 | −5 | 3,500 | 3,800 | 700 | 170 | 128 | | 67 |
| 6 | 9 | 0.22 | 2.0 | 4.0 | 6.0 | 1.85 | −14 | 3,100 | 3,000 | 1,200 | 200 | 128 | | 69 |

[1] Polymerization Temperature=130° F. (Polymers Extracted with Heptane, Isopropyl Alcohol).
[2] At 12"/min. (Instron Crosshead speed).
[3] Difference between brittle temperature of copolymer and brittle temperature of homopolymer with the same melt index.

TABLE IV.—COMBINATION COPOLYMERS (>8% ETHYLENE) PHYSICAL PROPERTIES

| Ex. No. | No. of $C_2$ Add. | Percent $C_2$ per Add. | Total Percent $C_2$ Interm. | Percent $C_2$ as a Block | Total $C_2$ by IR | Melt. Index at 230° C. | Notched Brittle Temp., °C. | Gurley Stiffness, mg./20 mil | Tensile at Yield, p.s.i.[1] | Percent Elong. at Break | Tensile Impact ft. lb./ in.[2] | Vicat Soft Temp., °C. | Percent Heptane Inso. | Decrease in Brittle Temp., °C.[2] |
|---|---|---|---|---|---|---|---|---|---|---|---|---|---|---|
| 1 | 3 | 0.7 | 2.1 | 10 | 12.1 | 2.0 | +1 | 4,000 | 3,800 | 500 | 175 | 138 | | 56 |
| 2 | 5 | 0.25 | 1.25 | 14.7 | 15.9 | 0.3 | −20 | 5,000 | 3,400 | 1,100 | 266 | | 90 | 56 |
| 3 | 8 | 0.15 | 1.2 | 7.1 | 8.3 | 3.1 | −1 | 4,800 | 4,400 | 600 | 100 | 144 | | 65 |
| 4 | 10 | 0.25 | 2.5 | 10.3 | 12.8 | 0.3 | −30 | 3,700 | 3,800 | >1,400 | | 140 | 85 | 66 |
| 5 | 8 | 0.20 | 1.6 | 10.4 | 12.0 | 0.8 | −31 | 4,400 | 3,100 | 1,100 | 225 | 136 | | 78 |

[1] At 12"/min. (Instron Crosshead speed).
[2] Difference between brittle temperature of copolymer and brittle temperature of homopolymer with the same melt index.

TABLE V

| | Polymer Description | Melt Index at 230° C. | Brittle Temperature Notched | Brittle Temperature ASTM (Unnotched) | Tensile Yield, p.s.i. | Percent Elong. at Break | Gurley Stiffness, mg./20 mil | Rockwell 'R' Hardness | Crys. Melt Point, °C. | Vicat Soft Temp., °C. | Ft.lbs./ in.[2] | Density |
|---|---|---|---|---|---|---|---|---|---|---|---|---|
| Example No.: | | | | | | | | | | | | |
| 1. | Commercial A | 3.1 | −19 | −25 | 2,500 | 1,100 | 3,300 | 45 | 162 | 126 | 58 | 0.901 |
| 2. | Commercial B | 2.0 | | −22 | 3,500 | >650 | | 74 | | 133 | 85 | 0.906 |
| 3. | Commercial Polypropylene Homopolymer. | 3.4 | +55 | +10 | 4,600 | 25 | 7,000 | 104 | 170 | 150 | 20 | 0.903 |
| Polypropylene, Intermittent Ethylene (1% Ethylene) Copolymer (no final ethylene block copolymer added) | | | | | | | | | | | | |
| 4. | | 3.2 | +19 | | 4,700 | 1,000 | 6,000 | | 160 | >143 | 35 | 0.900 |
| 5. | | 3.0 | +20 | | 5,200 | 40 | 6,700 | | 166 | >143 | 31 | 0.902 |
| 6. | | 0.3 | +10 | | 4,600 | 1,000 | 5,700 | 98 | 170 | >143 | 75 | 0.900 |
| Polypropylene, Ethylene Block Copolymer | | | | | | | | | | | | |
| 7. | 11% (ethylene) | 2.5 | +6 | <−20 | 4,800 | 60 | 7,900 | 98 | 167 | >−148 | 80 | 0.901 |
| Polypropylene, Random Ethylene, Propylene Block Copolymer | | | | | | | | | | | | |
| 8. | 10% (ethylene) | 2.1 | −10 | <−35 | 3,800 | 300 | 5,500 | 90 | 159 | | | 0.902 |
| Intermittent, Ethylene Block Copolymer (this invention) | | | | | | | | | | | | |
| 9. | 5% (ethylene) | 4.2 | 0 | <−20 | 4,300 | 500 | 5,500 | | 167 | 210 | | 0.898 |
| 10. | do | 9.0 | +25 | <−5 | 4,700 | 30 | 6,000 | | 155 | 148 | 83 | 0.897 |

EFFECTS OF THE COMBINATION OF THE INTERMITTENT AND ETHYLENE BLOCK COPOLYMER ON THE PHYSICAL PROPERTIES OF POLYPROPYLENE

In the following will be described in more detail the physical properties of the copolymers of this invention.

(1) Notched Brittle Temperature and Tensile Impact Strength and, (2) Tensile Yield Strength and Elongation at Break.

Notched brittle temperature and tensile impact strength

Notched brittle temperatures of 0° C. or below and tensile impact strengths over 100 ft. lbs./in.$^2$ for a 3 to 5 melt index copolymer of this invention can be obtained as shown in Tables VI, VII and VIII when:

(a) The polymer contains 1 to 2% ethylene intermittently followed by a 3% or more block of ethylene.

(b) The ethylene is added in at least four additions intermittently.

The brittle temperatures do not appear as dependent on the catalyst reactivity, whereas the tensile impact increases with the increase in catalyst reactivity.

In comparison to a block copolymer ethylene of similar brittle temperature, melt index and ethylene content, the copolymer (of this invention) impact strength is nearly doubled as shown in the tables. In comparison to homopolymer, the impact strength may range from 3 to 10 times more with the intermittent ethylene addition and a 3.0 to 10% post ethylene block.

Tensile yield strength and elongation at break

The tensile yield strength and percent elongation at break for the combination copolymers of this invention were obtained from the Instron Tensile Tester at 12 inches per minute. A tensile yield strength of 4500–5000 p.s.i., as compared to 4800–5800 for a polypropylene control, is obtained generally with 3 to 6 intermittent additions of 1 to 2% total ethylene intermittently.

The tensile yield begins to drop below 4500 p.s.i. when the catalyst reactivity exceeds 600 g./g./hr. and when there are more than 8 intermittent ethylene additions. The more frequent disruption of the polypropylene chains with the intermittent ethylene addition, and with an increase in the amorphous polypropylene at high catalyst reactivities results in decrease of the crystallinity of the polymer and this lowers the tensile yield strength and increases the elongation at break. The tensile impact strength correspondingly is improved.

The above examples demonstrate that the best improvement in the tensile impact resistance of polypropylene was obtained by combining an ethylene block copolymer with an intermittent ethylene-propylene random copolymer. With these intermittent combination copolymers a 67° C. decrease in the notched brittleness temperature was obtained on a polymer with a melt index of 4.2. The polymer contained 1% ethylene added intermittently every 15 minutes and 4% ethylene as a block copolymer. Although the tensile yield strength and stiffness were slightly decreased, a tensile impact of 210 ft.

TABLE VI.—EFFECT OF COMBINING THE INTERMITTENT OR CONTINUOUS ADDITION OF ETHYLENE, WITH AN ETHYLENE BLOCK COPOLYMER ON POLYPROPYLENE TENSILE IMPACT STRENGTH

| Example: | Melt Index | No. of C$_2$ Additions | Total percent C$_2$ Intermittent | Percent Ethylene in Block Copolymer | Notched Brittle Temp., °C. | Tensile Impact, ft. lbs./in. |
|---|---|---|---|---|---|---|
| Catalyst Activity: 300–400 (g. of Polymer/g. of Catalyst/hour) | | | | | | |
| 1 [1] | 3.4 | (Batch Reactor Homopolymer) | | | +53 | 30 |
| 2 | 2.6 | (Batch Reactor Homopolymer) | | | +61 | 20 |
| 3 [1] | 2.5 | | | 6.0 | +6 | 50 |
| 4 | 4.2 | 4 | 1.2 | 2.2 | 0 | 210 |
| 5 | 2.8 | 9 | 2.0 | 3.5 | −13 | 150 |
| 6 [1] | 1.0 | 10 | 2.4 | 3.0 | −3 | >150 |
| 7 [1] | 6.0 | (5.7% Random C$_2$) | | | +15 | 80 |

[1] Polymerization Temperature: 130° F., all other runs at 150° F.

TABLE VII.—EFFECT OF COMBINING THE INTERMITTENT OR CONTINUOUS ADDITION OF ETHYLENE, WITH AN ETHYLENE BLOCK COPOLYMER ON POLYPROPYLENE TENSILE IMPACT STRENGTH

| Example: | Melt Index | No. of C$_2$ Additions | Total percent C$_2$ Intermittent | Percent Ethylene in Block Copolymer | Notched Brittle Temp., °C. | Tensile Impact, ft. lbs./in.$^2$ |
|---|---|---|---|---|---|---|
| Catalyst Activity: (400–600 g./g./hour) | | | | | | |
| 1 [1] | 3.4 | (Batch Reactor Homopolymer) | | | +53 | 30 |
| 2 | 2.7 | (Batch Reactor Homopolymer) | | | +61 | 20 |
| 3 | 4.2 | | | 3.8 | +24 | 25 |
| 4 | 3.0 | | | 7.5 | +4 | 56 |
| 5 | 1.8 | 3 | 1.0 | 3.5 | +3 | 90 |
| 6 | 2.0 | 3 | 2.1 | 10.0 | +1 | 175 |
| 7 | 1.0 | 2 | 3.0 | 3.0 | −6 | 180 |
| 8 | 0.6 | 8 | 2.0 | 4.7 | −15 | 190 |
| 9 | 1.8 | 9 | 2.0 | 4.0 | −14 | 200 |
| 10 | 3.1 | 8 | 1.2 | 7.1 | −1 | 100 |
| 11 | 0.8 | 8 | 1.6 | 10.4 | −31 | 225 |
| 12 | 1.3 | (2% Random Ethylene) | | 6.0 | −13 | 100 |

[1] Polymerization Temperature: 130° F., all other runs at 150° F.

TABLE VIII.—EFFECT OF COMBINING THE INTERMITTENT OR CONTINUOUS ADDITION OF ETHYLENE, WITH AN ETHYLENE BLOCK ON POLYPROPYLENE TENSILE IMPACT STRENGTH

| Example: | Melt Index | No. of C$_2$ Additions | Total percent C$_2$ Intermittent | Percent Ethylene in Block Copolymer | Notched Brittle Temp., °C. | Tensile Impact, ft. lbs./in.$^2$ |
|---|---|---|---|---|---|---|
| Catalyst Activity: (600 g./g./hour) | | | | | | |
| 1 [1] | 3.4 | (Batch Reactor Homopolymer) | | | +53 | 30 |
| 2 | 2.6 | (Batch Reactor Homopolymer) | | | +61 | 20 |
| 3 | 0.7 | | | 10.0 | −2 | 72 |
| 4 | 0.7 | 7 | 1.7 | 8.8 | +4 | 150 |
| 5 | 0.3 | 5 | 1.2 | 14.7 | −20 | 266 |
| 6 | 3.0 | 4 | 2.0 | 6.0 | −5 | 170 |
| 7 | 0.3 | 10 | 2.5 | 10.4 | −30 | 200 |
| 8 | 4.2 | 5 | 1.3 | 4.2 | −3 | 150 |

[1] Polymerization Temperature: 130° F., all other runs at 150° F.

lbs./in.$^2$, in comparison to 20 to 40 ft. lbs./in.$^2$ for propylene homopolymer, was obtained. A copolymer prepared in accordance with this invention with a melt index of 9 and 1% ethylene added intermittently and 4% ethylene as a block copolymer also showed low brittle temperature and improved tensile impact. Brittle temperatures well below 0° C. can be obtained with less than 10% ethylene incorporation in accordance with this invention.

Although data and information has been presented above with respect to substantially only the use of ethylene as the preferred comonomer for the intermittent addition as well as the block copolymer segment since this is the preferred comonomer, other alpha-olefins as heretofore described can also be employed in similar manner with ethylene as the preferred comonomer. It has been shown for example that optimum properties (improved) are obtained when a total of 1 to 2% ethylene is added intermittently into a bulk propylene polymerization reaction at 10 to 15 minute intervals between additions. It likewise has been found that the addition of ethylene in amounts of 2 to about 4% intermittently at about 30 minute intervals improves the low temperature brittleness properties but has a noticeable adverse effect on others such as stiffness. Additions of ethylene incrementally at less than 10 minutes between the additions while resulting in greater decreases in brittle temperatures increases the amorphous content of the copolymer. Accordingly the preferred copolymers are prepared by the incorporation of small substantially equal increments of ethylene at 10 to 15 minute intervals between additions as set forth above.

In the above examples it has also been illustrated that a monomer other than ethylene, that is propylene can be used as the final or terminating block copolymer. Likewise a random ethylene-propylenen copolymer comprising a larger block segment than any of the individual intermittent blocks can be used as the terminating block segment. The preferred copolymers of this invention, however, are those constituting the use of ethylene as the intermittent comonomer and as the final terminating block, that is, a polyethylene block.

While in the above examples unmodified polypropylene compositions are produced, it is obvious that other materials such as dyes, pigments, fibers, and other polymers may be introduced into the polypropylene compositions of the present invention without substantial alteration of the physical properties of the shaped structures formed from such compositions.

The polypropylene compositions formed in accordance with the present invention can be fabricated into useful articles in the same manner as polypropylene. For example, the compositions can be blow-molded, injection molded or extruded to form wastebaskets, bottles, tubing, films, and the like.

Many equivalent modifications will be apparent to those skilled in the art from a reading of the foregoing without a departure from the inventive concept.

What is claimed is:

1. A composition of matter comprising a polypropylene block copolymer composed of polymer block chain segments AB and C, said AB block chain segment comprising crystalline polypropylene block chain segments A containing at intervals along the length thereof block chain segments of a random copolymer B of propylene and at least one other alpha-olefin monomer having from 2 to 12 carbon atoms, the total amount of alphaolefin monomer other than propylene in said random copolymer block chain segments B ranging from about 0.5 to 3.0 percent by weight of said AB block chain segments and, attached to at least one end of said block chain segments AB a block chain segment C of polyethylene the amount of said polyethylene block chain segments C being from about 3 to 20% by weight of the total composition said composition having an average molecular weight of from about 50,000 to 1,000,000, and said composition having improved low temperature brittleness and high tensile yield impact properties.

2. The composition of claim 1 wherein ethylene is employed in the random copolymer block segment B.

3. The composition of claim 1 wherein ethylene is employed in the random copolymer block segment B in amounts for all of said block segments of from 1 to 2 percent by weight.

4. The composition of claim 3 wherein the amount of the block chain segment C is from 3 to 12 percent.

5. A composition of matter comprising a polypropylene block copolymer composed of polymer block chain segments AB and C, said AB block segment consisting of a crystalline polypropylene block chain segment A containing at intervals along the length thereof a plurality of block chain segments of an ethylene-propylene random copolymer B, the total amount of ethylene in said ethylene-propylene block chain segments B ranging from about 0.5 to 3.0 percent by weight of said AB block chain segment and, attached to at least one end of said block chain segments AB a block chain segment C of polyethylene, the amount of said polyethylene block chain segment C being from about 3 to 10 percent by weight of the total composition, said composition having an average molecular weight of from about 50,000 to about 1,000,000 and said composition having improved low temperature brittleness and high tensile yield and tensile impact properties.

6. The composition of claim 5 wherein the ethylene in the random copolymer B segment ranges from 1 to 2 percent by weight.

References Cited

UNITED STATES PATENTS

| 3,268,624 | 8/1966 | Jezi et al. | 260—878 |
| 3,301,921 | 1/1967 | Short | 260—878 |

FOREIGN PATENTS

| 714,621 | 7/1965 | Canada. |
| 615,048 | 1/1961 | Italy. |
| 994,416 | 6/1965 | Great Britain. |

SAMUEL H. BLECH, Primary Examiner

M. J. TULLY, Assistant Examiner